US012609225B2

(12) United States Patent
Lee et al.

(10) Patent No.: US 12,609,225 B2
(45) Date of Patent: Apr. 21, 2026

(54) MAGNETIC CORE AND COIL COMPONENT COMPRISING SAME

(71) Applicant: LG Innotek Co., LTD., Seoul (KR)

(72) Inventors: Seung Eun Lee, Seoul (KR); Ji Chang Ryu, Seoul (KR); Jung Ki Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 349 days.

(21) Appl. No.: 18/277,841

(22) PCT Filed: Feb. 18, 2022

(86) PCT No.: PCT/KR2022/002426
§ 371 (c)(1),
(2) Date: Aug. 18, 2023

(87) PCT Pub. No.: WO2022/177349
PCT Pub. Date: Aug. 25, 2022

(65) Prior Publication Data

US 2024/0136094 A1 Apr. 25, 2024
US 2024/0233989 A9 Jul. 11, 2024

(30) Foreign Application Priority Data

Feb. 19, 2021 (KR) ........................ 10-2021-0022522

(51) Int. Cl.
*H01F 1/147* (2006.01)
*C22C 38/00* (2006.01)
*C22C 38/02* (2006.01)

(52) U.S. Cl.
CPC ....... *H01F 1/14766* (2013.01); *C22C 38/002* (2013.01); *C22C 38/02* (2013.01); *C22C 2202/02* (2013.01)

(58) Field of Classification Search
CPC ... C22C 2202/02; C22C 38/002; C22C 38/02; H01F 1/14766; H01F 1/15308; H01F 1/15375; H01F 17/062; H01F 3/08
See application file for complete search history.

(56) References Cited

U.S. PATENT DOCUMENTS

2019/0333665 A1 10/2019 Maruyama et al.

FOREIGN PATENT DOCUMENTS

EP 1385179 1/2004
JP 2000-345308 12/2000
(Continued)

OTHER PUBLICATIONS

Extended European Search Report dated Jul. 11, 2024 issued in Application No. 22756547.0.
(Continued)

*Primary Examiner* — Lawrence D Ferguson
(74) *Attorney, Agent, or Firm* — KED & ASSOCIATES, LLP

(57) ABSTRACT

A magnetic core according to one embodiment of the present invention includes a material formed of iron (Fe)-silicon (Si)-boron (B), wherein a mass percentage of Fe in a first surface, which is an upper surface, is different from a mass percentage of Fe in a second surface which is a side surface, and a ratio of the mass percentage of Fe in the first surface to a difference between the mass percentage of Fe in the first surface and the mass percentage of Fe in the second surface is in the range of 6 to 21.

7 Claims, 11 Drawing Sheets

(56) References Cited

FOREIGN PATENT DOCUMENTS

| | | |
|---|---|---|
| JP | 2015-012146 | 1/2015 |
| JP | 2015-084353 | 4/2015 |
| KR | 10-2017-0133488 | 12/2017 |
| KR | 10-2018-0071828 | 6/2018 |
| KR | 10-2019-0093436 | 8/2019 |

OTHER PUBLICATIONS

International Search Report (with English Translation) and Written Opinion dated May 31, 2022 issued in Application No. PCT/KR2022/002426.

MAGNETIC CORE AND COIL COMPONENT COMPRISING SAME

CROSS-REFERENCE TO RELATED PATENT APPLICATIONS

This application is a U.S. National Stage Application under 35 U.S.C. § 371 of PCT Application No. PCT/KR2022/002426, filed Feb. 18, 2022, which claims priority to Korean Patent Application No. 10-2021-0022522, filed Feb. 19, 2021, whose entire disclosures are hereby incorporated by reference.

TECHNICAL FIELD

The present invention relates to a magnetic core and a coil component.

BACKGROUND ART

High-current reduction inductors, high-current boost inductors, and three-phase line reactors for power factor correction (PFC) used in photovoltaic systems, wind power generation systems, electric vehicles, and the like include coils wound around magnetic cores. A magnetic core included in a high-current inductor or high-current reactor should have high DC current superposition characteristics at a high-current, low core loss at a high frequency, and a stable permeability.

Meanwhile, a density of the magnetic core and a particle distribution in the magnetic core may affect the loss and permeability of the magnetic core. In order to obtain a magnetic core with low loss and high permeability, it is necessary to optimize a density and a particle distribution.

DISCLOSURE

Technical Problem

The present invention is directed to providing a magnetic core and a coil component including the same.

Technical Solution

One aspect of the present invention provides a magnetic core including a material formed of iron (Fe)-silicon (Si)-boron (B), wherein a mass percentage of Fe in a first surface, which is an upper surface, is different from a mass percentage of Fe in a second surface which is a side surface, and a ratio of the mass percentage of Fe in the first surface to a difference between the mass percentage of Fe in the first surface and the mass percentage of Fe in the second surface is in the range of 6 to 21.

The ratio of the mass percentage of Fe in the first surface to the difference between the mass percentage of Fe in the first surface and the mass percentage of Fe in the second surface may be in the range of 11 to 21.

The mass percentage of Fe in the first surface may be greater than the mass percentage of Fe in the second surface.

A porosity of the first surface may be different from a porosity of the second surface.

An average aspect ratio of the material formed of the Fe—Si—B in the first surface may be different from an average aspect ratio of the material formed of the Fe—Si—B in the second surface.

The magnetic core may further include a resin filling between the material formed of the Fe—Si—B, wherein a mass percentage of the resin in the second surface may be higher than a mass percentage of the resin in the first surface.

The resin may include at least one among zinc (Zn), oxygen (O), aluminum (Al), and carbon (C).

Mass percentages of the zinc (Zn) and the oxygen (O) in the second surface may be greater than mass percentages of the zinc (Zn) and the oxygen (O) in the first surface.

A difference between the mass percentage of Fe and a mass percentage of Si in the first surface may be different from a difference between the mass percentage of Fe and a mass percentage of Si in the second surface.

The difference between the mass percentage of Fe and the mass percentage of Si in the first surface may be greater than the difference between the mass percentage of Fe and the mass percentage of Si in the second surface.

The magnetic core may have a toroidal shape.

Another aspect of the present invention provides a magnetic core including a material formed of iron (Fe)-silicon (Si)-boron (B), and a mass percentage of Fe in a first surface, which is an upper surface, is different from a mass percentage of Fe in a second surface which is a side surface, and a ratio of the mass percentage of Fe in the second surface to a difference between the mass percentage of Fe in the first surface and the mass percentage of Fe in the second surface is in the range of 5 to 20.

The ratio of the mass percentage of Fe in the second surface to a difference between the mass percentage of Fe in the first surface and the mass percentage of Fe in the second surface may be in the range of 10 to 20.

The mass percentage of Fe in the first surface may be greater than the mass percentage of Fe in the second surface.

Still another aspect of the present invention provides a coil component including a magnetic core and a coil wound around the magnetic core, wherein the magnetic core includes a material formed of iron (Fe)-silicon (Si)-boron (B), and a mass percentage of Fe in an upper surface is different from a mass percentage of Fe in a second surface of a side surface, and a ratio of the mass percentage of Fe in the first surface to a difference between the mass percentage of Fe in the first surface and the mass percentage of Fe in the second surface is in the range of 6 to 21.

Advantageous Effects

According to an embodiment of the present invention, a magnetic core with low loss and high permeability can be obtained. Accordingly, the number of turns of a coil can be reduced, and a coil component can be miniaturized. In addition, according to the embodiment of the present invention, the magnetic core which can satisfy various needs according to an application field and required characteristics can be obtained.

Accordingly, the magnetic core and the coil component according to the embodiment of the present invention can be applied to a vehicle and an industrial use that include a high-current inductor and a high-current reactor.

MODES OF THE INVENTION

Hereinafter, exemplary embodiments of the present invention will be described in detail with reference to the accompanying drawings.

However, the technical spirit of the present invention is not limited to some embodiments that will be described and may be implemented into various other embodiments, and at least one component of the embodiments may be selectively coupled, substituted, and used in the range of the technical spirit of the present invention.

In addition, unless clearly and specifically defined otherwise by the context, terms (including technical and scientific terms) used herein may be interpreted as having meanings generally understood by those skilled in the art, and the meanings of generally used terms, such as those defined in commonly used dictionaries, will be interpreted in consideration of contextual meanings of the related art.

In addition, terms used in the embodiments of the present invention are considered in a descriptive sense and not to limit the present invention.

In the present specification, unless clearly described otherwise by the context, singular forms may include the plural forms thereof, and in a case in which "at least one (or one or more) among A, B, and C" is described, this may include at least one among all possible combinations of A, B, and C.

In addition, in descriptions of components of the embodiments of the present invention, terms such as "first," "second," "A," "B," "(a)," and "(b)" may be used.

Such terms are only to distinguish one component from another component, and the essence, order, and the like of the components are not limited by the terms.

In addition, when a first element is referred to as being "connected," "coupled," or "linked" to a second element, such a description may include both a case in which the first element is directly connected, coupled, or linked to the second element, and a case in which the first element is connected, coupled, or linked to the second element with a third element disposed therebetween.

In addition, when a first element is described as being formed or disposed "on" or "under" a second element, such a description includes both a case in which the two elements are formed or disposed in direct contact with each other and a case in which one or more other elements are interposed between the two elements. In addition, when a first element is described as being formed "on or under" a second element, such a description may include a case in which the first element is formed at an upper side or a lower side with respect to the second element.

Figure 1:
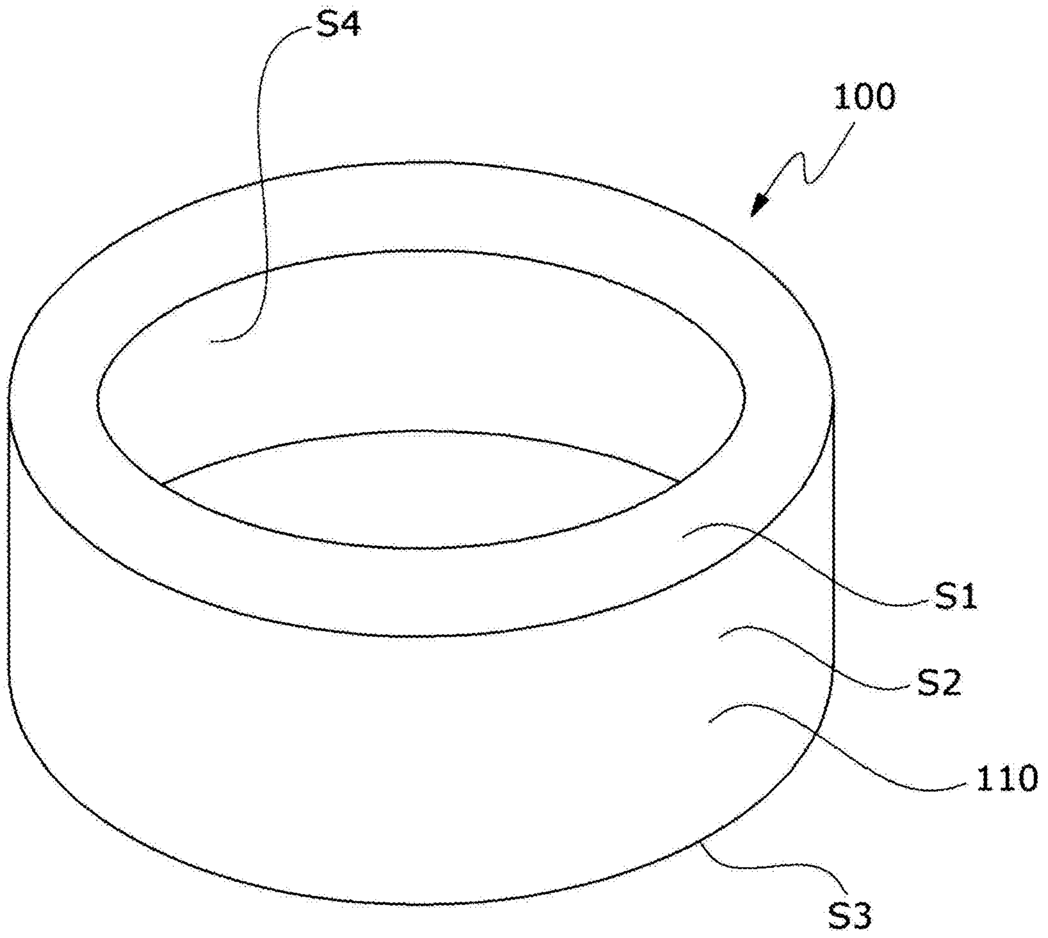
FIG. 1 is a perspective view illustrating a magnetic core according to one embodiment of the present invention.
Figure 2:
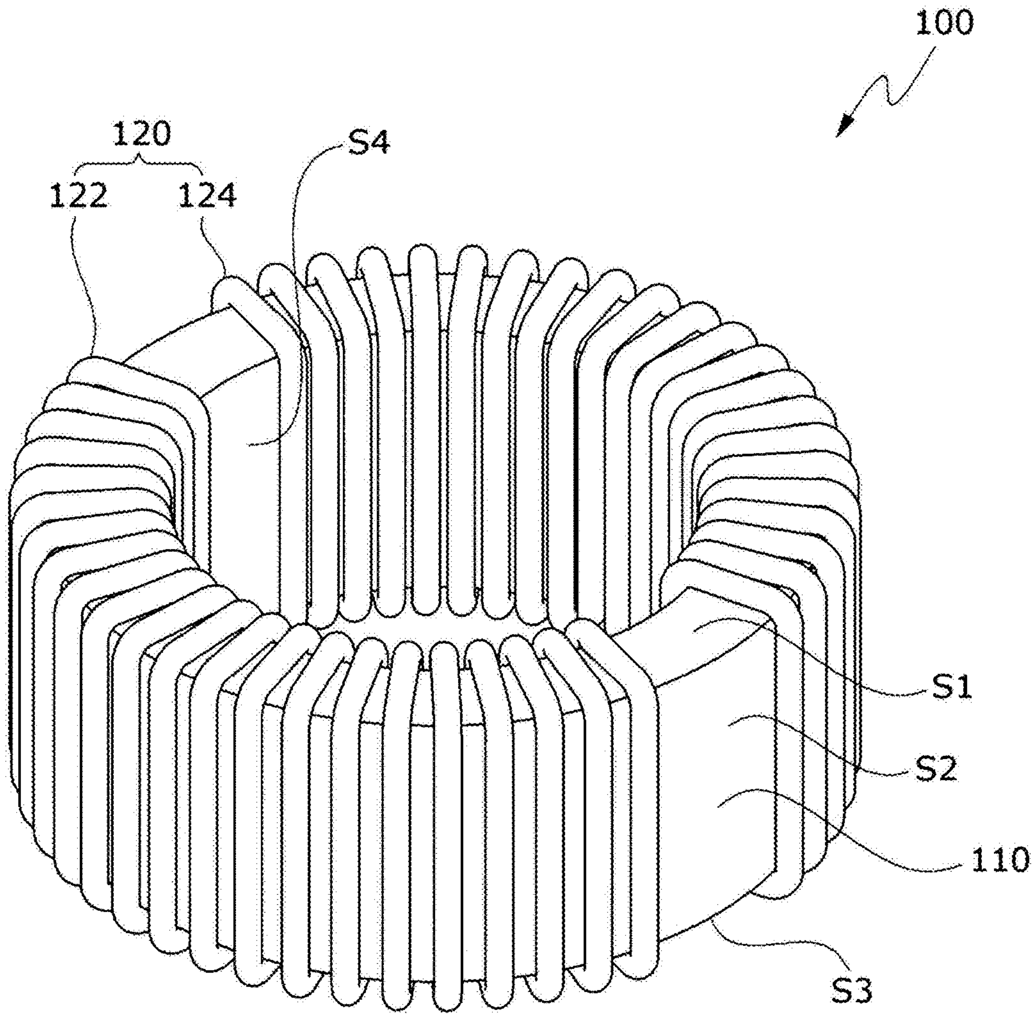
FIG. 2 is a perspective view illustrating a coil component according to one embodiment of the present invention.
Figure 3:
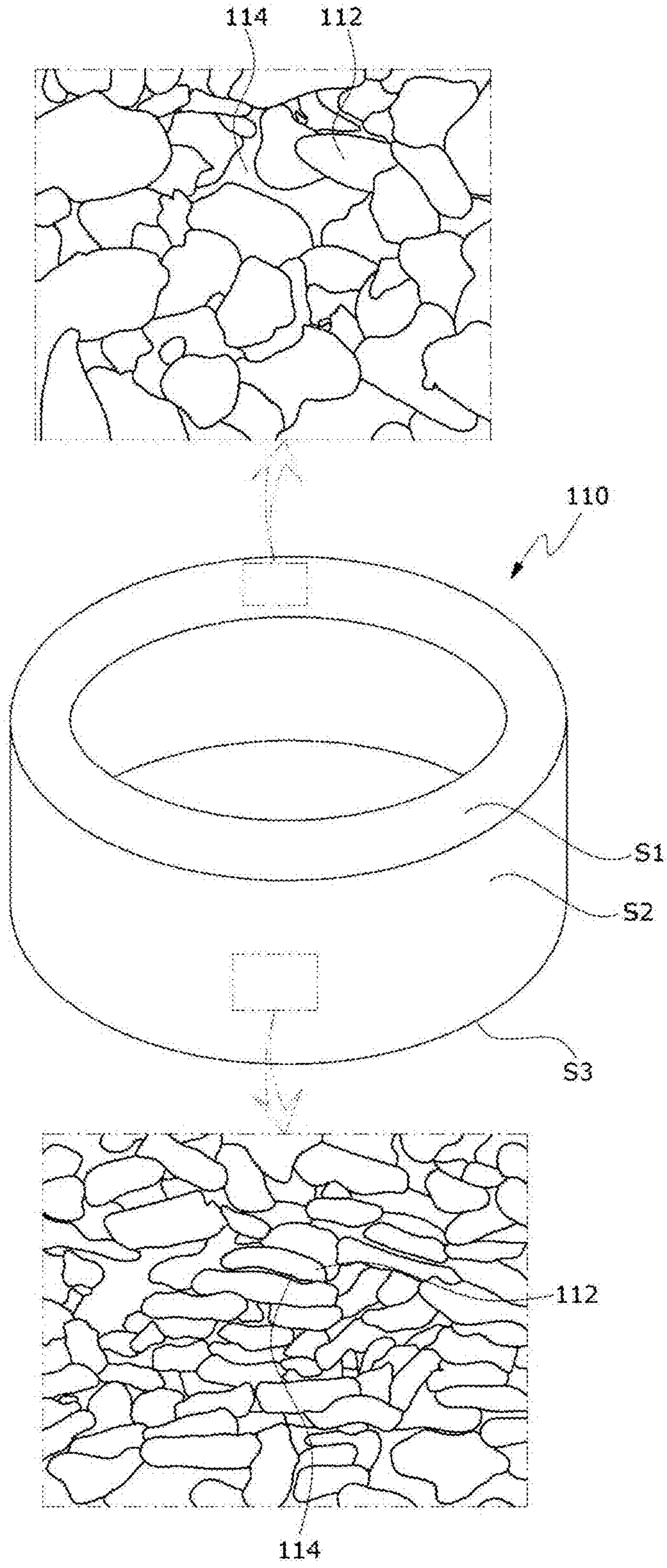
FIG. 3 is an enlarged view illustrating an upper surface and a side surface of the magnetic core according to one embodiment of the present invention.

FIG. 1 is a perspective view illustrating a magnetic core according to one embodiment of the present invention, FIG. 2 is a perspective view illustrating a coil component according to one embodiment of the present invention, and FIG. 3 is an enlarged view illustrating an upper surface and a side surface of the magnetic core according to one embodiment of the present invention.

Referring to FIGS. 1 and 2, a coil component 100 includes a magnetic core 110 and a coil 120 wound around the magnetic core 110. In this case, the magnetic core 110 may have a toroidal shape, and the coil 120 may include a first coil 122 wound around the magnetic core 110 and a second coil 124 wound around the magnetic core 110 to be symmetrical to the first coil 122. The first coil 122 and the second coil 124 may be wound around an upper surface S1, an outer circumferential surface S2, a lower surface S3, an inner circumferential surface S4 of the magnetic core 110 having the toroidal shape. A bobbin (not shown) may be further disposed between the magnetic core 110 and the coil 120 to insulate the magnetic core 110 from the coil 120. The coil 120 may be formed of an electric wire of which a surface is coated with an insulating material. The electric wire may be formed of copper, silver, aluminum, gold, nickel, tin, or the like, of which a surface is coated with an insulating material, and a cross-section of the electric wire may have a circular or angular shape.

The coil component according to the embodiment of the present invention may be variously applied to, for example, an inductor, a choke coil, a transformer, a motor, a transformer for a direct current to direct current (DCDC) converter, an electromagnetic interference (EMI) shield, a power factor correction (PFC) inductor, or the like, but is not limited thereto, and may be applied to a vehicle and an industrial use.

Referring to FIG. 3, the magnetic core 110 according to the embodiment of the present invention includes a material 112 formed of iron (Fe)-silicon (Si)-boron (B) as a main material. The magnetic core according to the embodiment of the present invention may include the particles 112 formed of Fe—Si—B as a main material, and a resin 114 may fill pores between the particles formed of Fe—Si—B. In this case, the resin may serve as an insulator, a lubricant, and a binder. For example, the resin 114 may include at least one among kaolin, zinc (Zn) stearate, and water glass. The kaolin is aluminum hydrated silicate, a main component of the kaolin may be $Al2Si2O5(OH)4$, and the kaolin may be used as an insulating material. A main component of the zinc stearate may be $Zn(C18H35O2)2$, and the zinc stearate may be used as a lubricant. The water glass is a solution of sodium silicate obtained by melting silicon dioxide and alkali, a main component of the water glass may be $Na2SiO3$, and the water glass may be used as a binder.

The particles 112 formed of Fe—Si—B included in the magnetic core 110 according to the embodiment of the present invention may be a crushed powder of an amorphous ribbon formed of Fe—Si—B. Accordingly, the particles 112 formed of Fe—Si—B may each have a flake shape, and the magnetic core 110 may have a shape in which the flake-shaped particles 112 are stacked. In addition, the particles 112 formed of Fe—Si—B included in the magnetic core 110 according to the embodiment of the present invention may each have a particle size in the range of 20 μm to 160 μm. For example, D50 of the particles may be in the range of 65 μm to 85 μm, preferably in the range of 70 μm to 80 μm, and more preferably in the range of 72.5 μm to 77.5 μm, D10 of the particles may be in the range of 25 μm to 45 μm, preferably in the range of 30 μm to 40 μm, and more preferably in the range of 32.5 μm to 37.5 μm, and D90 of the particles may be 110 may be in the range of 110 μm to 140 μm, preferably in the range of 120 μm to 135 μm, and more preferably in the range of 125 μm to 130 μm. D10 means a particle diameter corresponding to 10% of a pass percentage in a particle size analysis data, D50 means a particle diameter corresponding to 50% of the pass percentage in the particle size analysis data, and D90 means a particle diameter corresponding to 90% of the pass percentage in the particle size analysis data. D50 may also be interchangeably used with an average particle size. When the particles 112 formed of Fe—Si—B included in the magnetic core 110 according to the embodiment of the present invention have such a shape and a particle distribution, since large particles are sequentially stacked from a lower surface to an upper surface, and empty spaces are filled with small particles, a density of the magnetic core 110 may increase. Accordingly, a porosity can be minimized, and a magnetic core with low loss and high permeability performance can be obtained.

Hereinafter, the upper surface S1 of the magnetic core 110 and the side surface S2 of the magnetic core 110 will be described. The description of the upper surface S1 of the magnetic core 110 may be equally applied to the lower surface S3 of the magnetic core 110. In addition, the description of the upper surface S1 of the magnetic core 110 may be equally applied to a cross section of the magnetic core 110 taken in a direction parallel to the upper surface S1 of the magnetic core 110. The description of the side surface S2 of the magnetic core 110 may be equally applied to the inner surface S4 of the magnetic core 110. In addition, the description of the side surface S2 of the magnetic core 110 may be applied to a cross section of the magnetic core 110 taken in a direction perpendicular to the upper surface S1 of the magnetic core 110.

According to the embodiment of the present invention, the particles 112 having the flake shape and formed of Fe—Si—B may be stacked in the direction parallel to the upper surface S1 or the lower surface S3 of the magnetic core 110, and the pores between the particles 112 formed of Fe—Si—B may be filled with the resin 114. Accordingly, a shape and composition of a particle distribution in the upper surface S1 of the magnetic core 110 and a shape and composition of a particle distribution in the side surface S2 of the magnetic core 110 may be different from each other. That is, upper surfaces of the particles 112 having the flake shape may be mainly disposed on the upper surface S1 of the magnetic core 110, and side surfaces of the particles 112 having the flake shape may be mainly disposed on the side surface S2 of the magnetic core 110. In this case, the shape of the particle distribution may be expressed as a porosity or an average aspect ratio. For example, a porosity of the side surface S2 of the magnetic core 110 may be greater than a porosity of the upper surface S1 of the magnetic core 110. In this case, a porosity may be a percentage of an area excluding an area occupied by the particles 112 formed of Fe—Si—B to a total area. For example, the porosity of the side surface S2 of the magnetic core 110 may be 2 or more times, preferably 2 to 2.5 times, and more preferably 2.2 to 2.4 times the porosity of the upper surface S1 of the magnetic core 110. In addition, an average aspect ratio of the upper surface S1 of the magnetic core 110 may be different from an average aspect ratio of the side surface S2 of the magnetic core 110. In this case, an aspect ratio may be a ratio of a width to a height of a particle. For example, the average aspect ratio of the upper surface S1 of the magnetic core 110 may be in the range of 1.1:1 to 1.4:1 and preferably in the range of 1.2:1 to 1.3:1, and the average aspect ratio of the side surface S2 of the magnetic core 110 may be in the range of 4.2:1 to 5.2:1, preferably in the range of 4.5:1 to 5:1, and more preferably in the range of 4.7:1 to 4.9:1. For example, the average aspect ratio of the side surface S2 of the magnetic core 110 may be 3 or more times, preferably 3.5 or more times, and more preferably 3.75 or more times the average aspect ratio of the upper surface S1 of the magnetic core 110. Accordingly, a density in the magnetic core can be maximized, the porosity can be minimized, and thus the magnetic core with low loss and high permeability performance can be obtained.

According to the embodiment of the present invention, a mass percentage of Fe in the upper surface S1 of the magnetic core 110 is different from a mass percentage of Fe in the side surface S2 of the magnetic core 110. For example, the mass percentage of Fe in the upper surface S1 of the magnetic core 110 may be greater than the mass percentage of Fe in the side surface S2 of the magnetic core 110. For example, the mass percentage of Fe in the upper surface S1 of the magnetic core 110 may be 1.02 or more times or more, preferably 1.05 to 1.2 times, and more preferably 1.1 to 1.2 times the mass percentage of Fe in the side surface S2 of the magnetic core 110. In this case, a ratio of the mass percentage of Fe in the upper surface S1 of the magnetic core 110 to a difference between the mass percentage of Fe in the upper surface S1 of the magnetic core 110 and the mass percentage of Fe in the side surface S2 of the magnetic core 110 may be in the range of 6 to 21 and preferably in the range of 11 to 21. In addition, a ratio of the mass percentage of Fe in the side surface S2 of the magnetic core 110 to the difference between the mass percentage of Fe in the upper surface S1 of the magnetic core 110 and the mass percentage of Fe in the side surface S2 of the magnetic core 110 may be in the range of 5 to 20 and preferably in the range of 10 to 20.

In addition, a mass percentage of the resin in the upper surface S1 of the magnetic core 110 is different from a mass percentage of the resin in the side surface S2 of the magnetic core 110. For example, the mass percentage of the resin in the side surface S2 of the magnetic core 110 may be greater than the mass percentage of the resin in the upper surface S1 of the magnetic core 110. As described above, when the resin 114 includes at least one among kaolin, zinc (Zn) stearate, and water glass, the resin 114 may include at least one among zinc (Zn), oxygen (O), aluminum (Al), and carbon (C), and a mass percentage of at least one among zinc (Zn), oxygen (O), aluminum (Al), and carbon (C) in the side surface S2 of the magnetic core 110 may be greater than a mass percentage of at least one among oxygen (O), aluminum (Al), and carbon (C) in the upper surface S1 of the magnetic core 110. For example, mass percentages of zinc (Zn) and oxygen (O) in the side surface S2 of the magnetic core 110 may be greater than mass percentages of zinc (Zn) and oxygen (O) in the upper surface S1 of the magnetic core 110.

Accordingly, a density in the magnetic core can be maximized, the porosity can be minimized, and thus the magnetic core with low loss and high permeability performance can be obtained.

Meanwhile, silicon (Si) may be included in the particles 112 formed of Fe—Si—B and also included in the resin 114 filling the pores between the particles 112 formed of Fe—Si—B. Accordingly, a difference between the mass percentage of Fe and a mass percentage of Si in the upper surface S1 of the magnetic core 110 may be different from a difference between the mass percentage of Fe and a mass percentage of Si in the side surface S2 of the magnetic core 110. As described above, the mass percentage of Fe in the upper surface S1 of the magnetic core 110 may be greater than the mass percentage of Fe in the side surface S2 of the magnetic core 110. In addition, the porosity of the side surface S2 of the magnetic core 110 may be greater than the porosity of the upper surface S1 of the magnetic core 110, and the pores between particles 112 formed of Fe—Si—B may be filled with the resin 114. Accordingly, the mass percentage of Si of the side surface S2 of the magnetic core 110 may be similar to the mass percentage of Si the upper surface S1 of the magnetic core 110, and as a result, the difference between the mass percentage of Fe and the mass percentage of Si in the side surface S2 of the magnetic core 110 may be less than the difference between the mass percentage of Fe and the mass percentage of Si in the upper surface S1 of the magnetic core 110.

Accordingly, the density in the magnetic core can be maximized, the porosity can be minimized, and thus, the magnetic core with low loss and high permeability performance can be obtained.

Hereinafter, results of energy dispersive X-ray (EDX) analysis of magnetic cores in a comparative example and an example will be described.

For EDX analysis, the magnetic core in the comparative example was formed of a crushed powder of an amorphous ribbon including Fe—Si—B and formed in a toroidal shape so that pores between particles, of which D10 was 33.9 μm, D50 was 85.4 μm, and D90 was 152.5 μm, were filled with a resin including kaolin, zinc (Zn) stearate, and water glass, and the magnetic core in the example was formed of a crushed powder of an amorphous ribbon including Fe—Si—B and formed in a toroidal shape so that pores between particles, of which D10 was 33.9 μm, D50 was 73 μm, and D90 was 127.4 μm, were filled with a resin including kaolin, zinc (Zn) stearate, and water glass.

EDX analysis was performed on one region of an upper surface of the magnetic core and two regions of a side surface of each magnetic core.

Figure 4A:
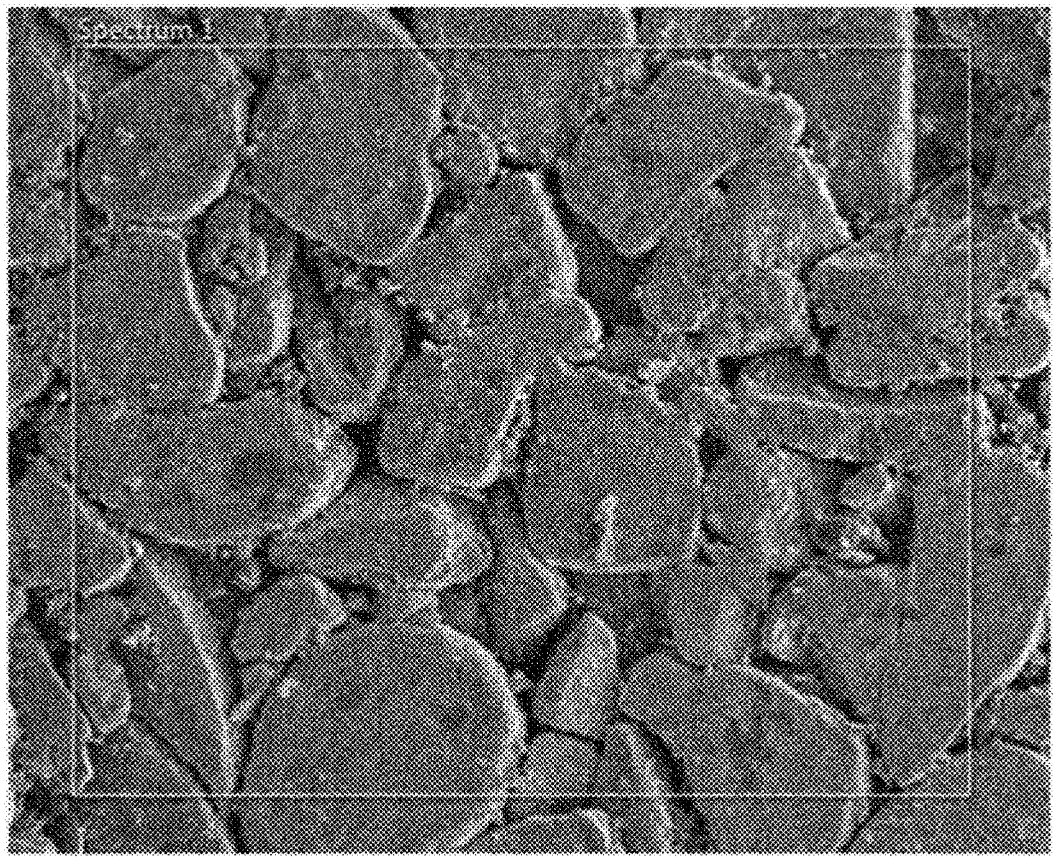
FIG. 4A shows a scanning electron microscope (SEM) image of an upper surface of a magnetic core in a comparative example.
Figure 4B:
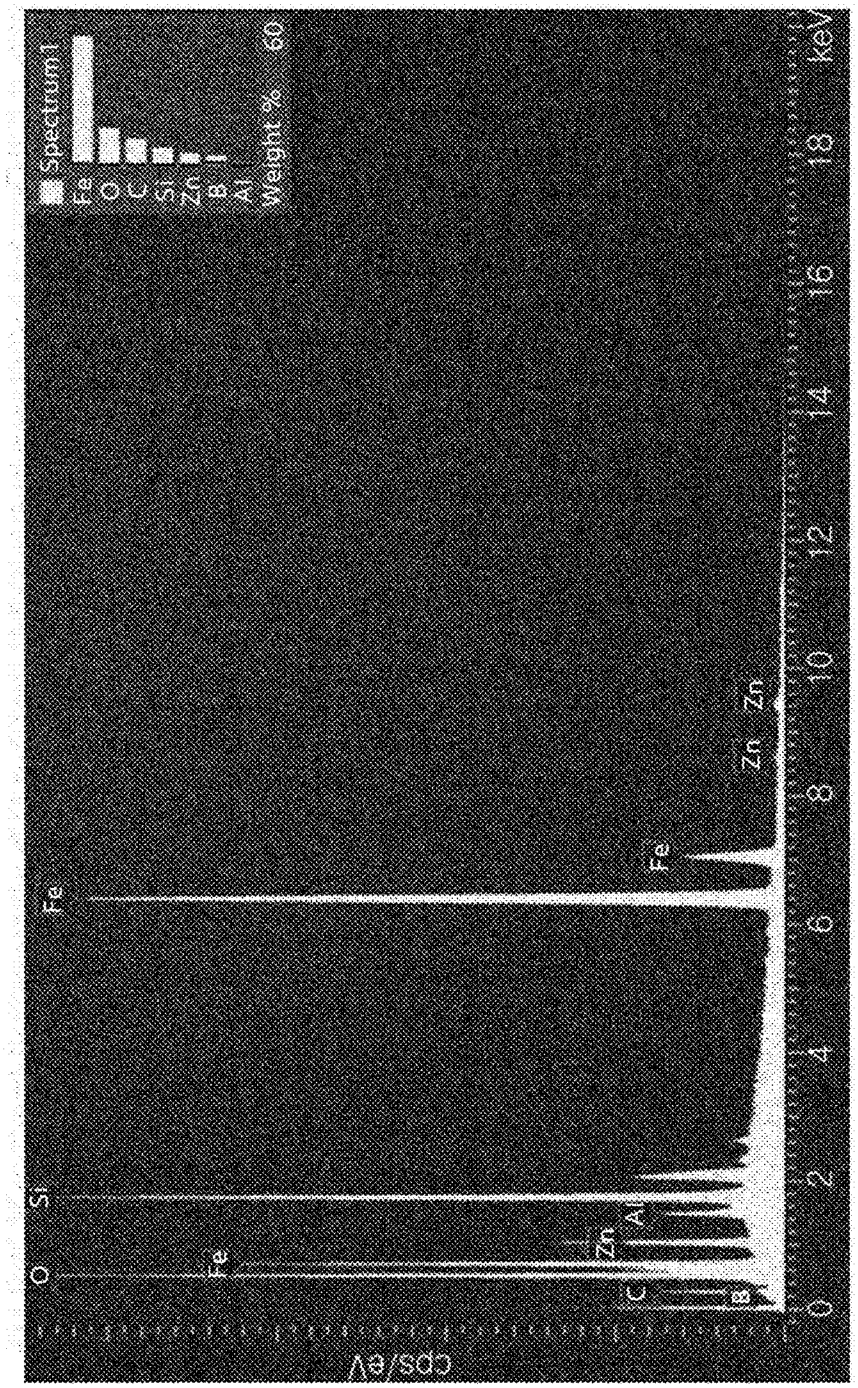
FIG. 4B shows an energy dispersive X-ray (EDX) analysis spectrum in the upper surface of the magnetic core in the comparative example.
Figure 5A:
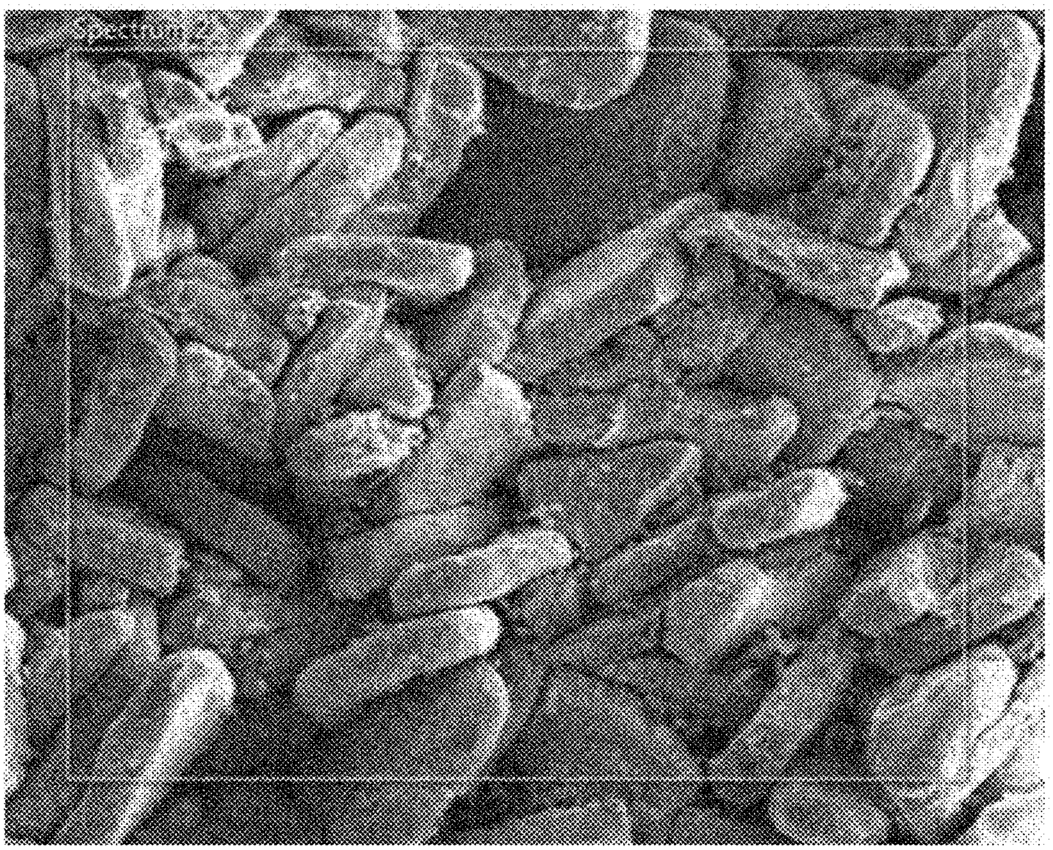
FIG. 5A shows a SEM image of a side surface of the magnetic core in the comparative example.
Figure 5B:
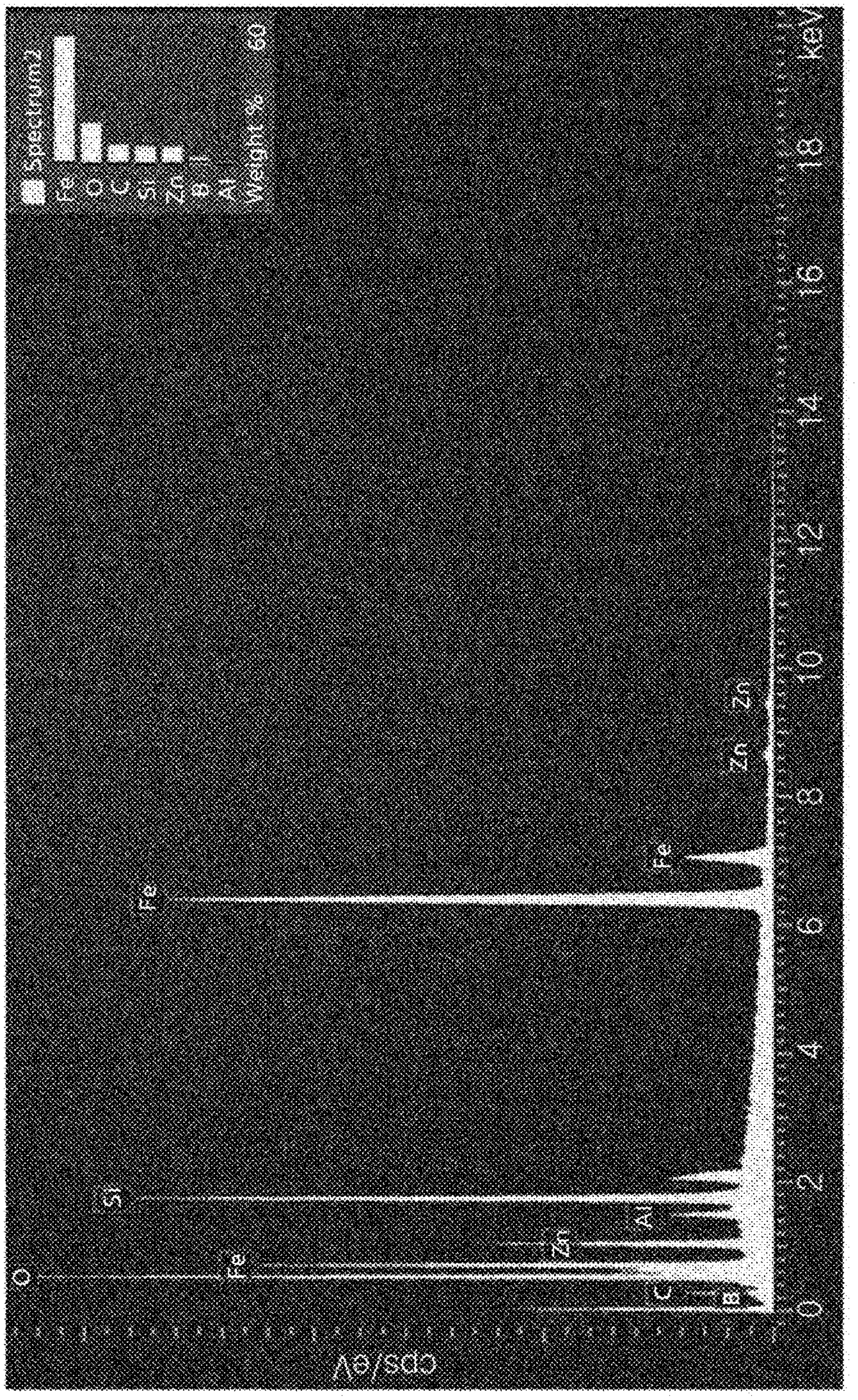
FIG. 5B shows an EDX analysis spectrum in the side surface of the magnetic core in the comparative example.
Figure 6A:
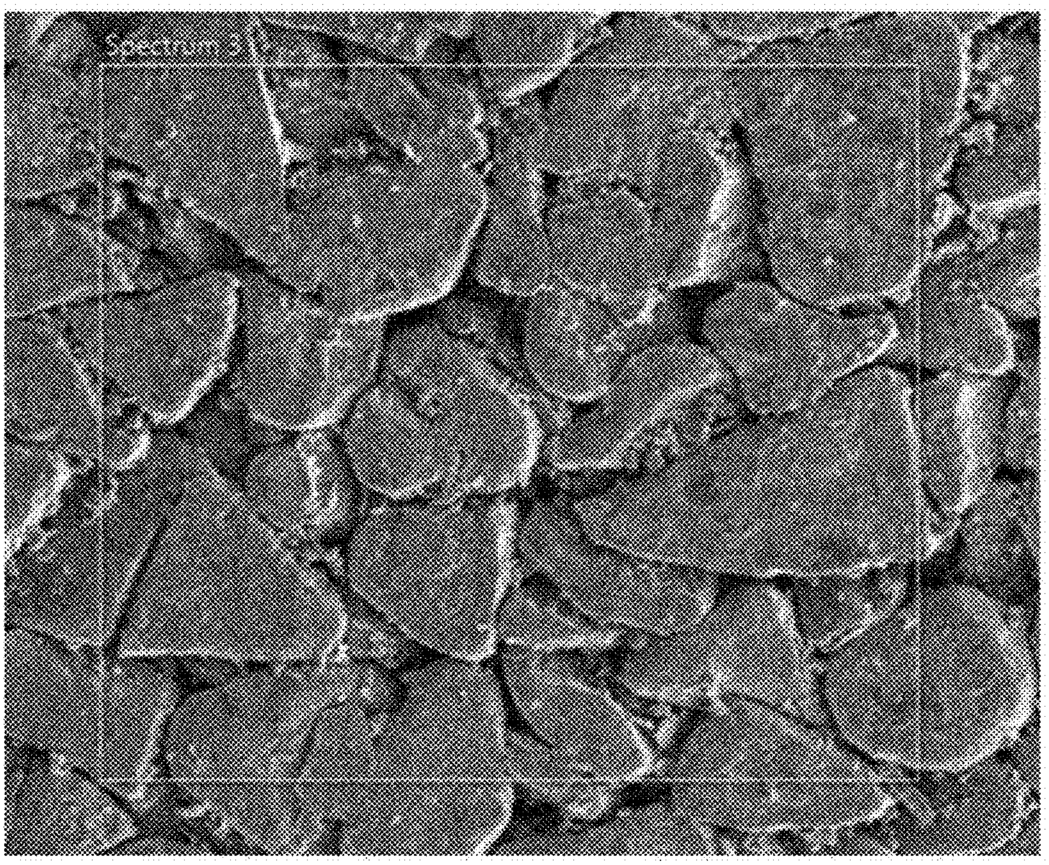
FIG. 6A shows a SEM image of an upper surface of a magnetic core in an example.
Figure 6B:
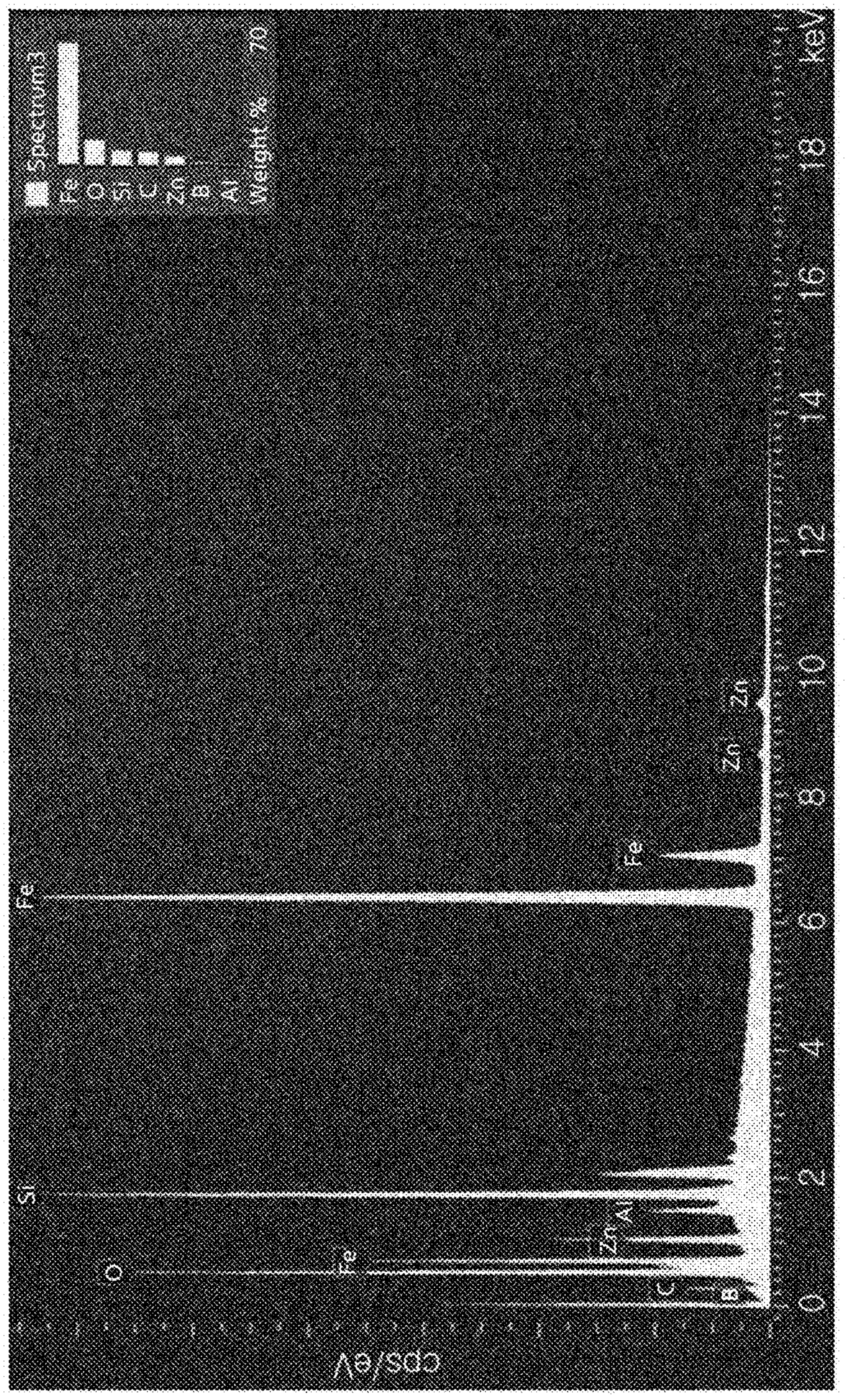
FIG. 6B shows an EDX analysis spectrum in an upper surface of the magnetic core in the example.
Figure 7A:
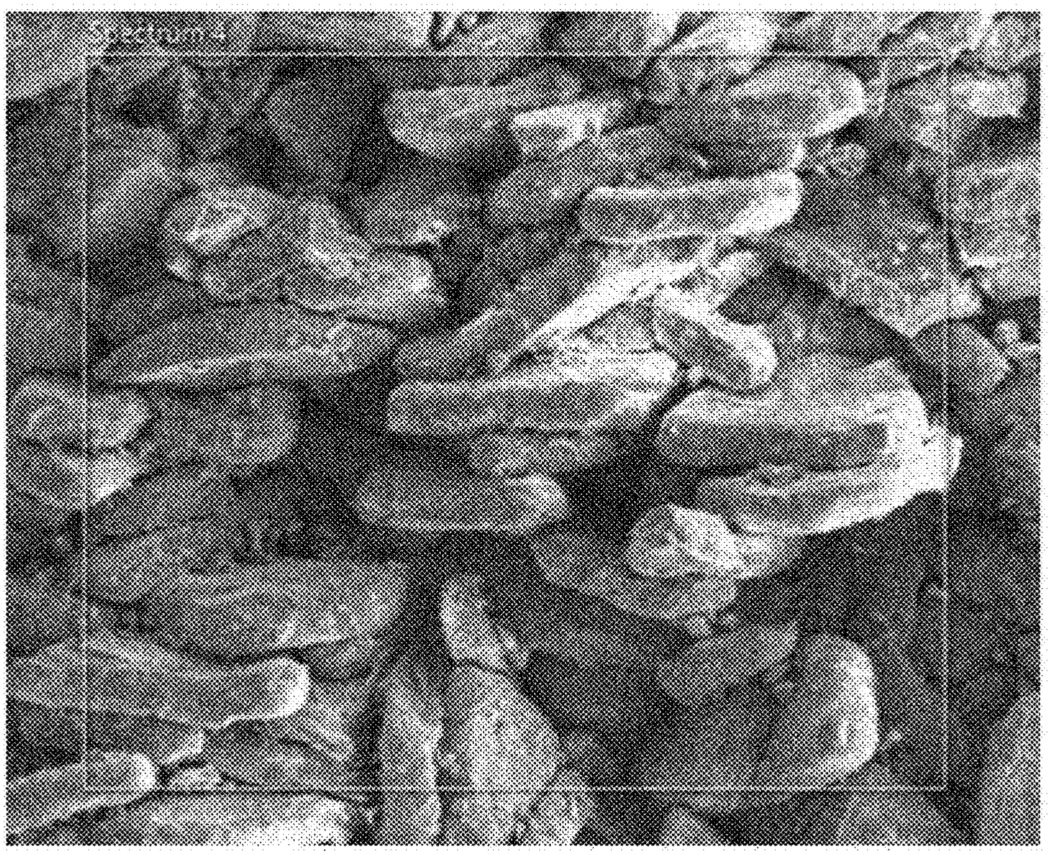
FIG. 7A shows a SEM image of the side surface of the magnetic core in the example.
Figure 7B:
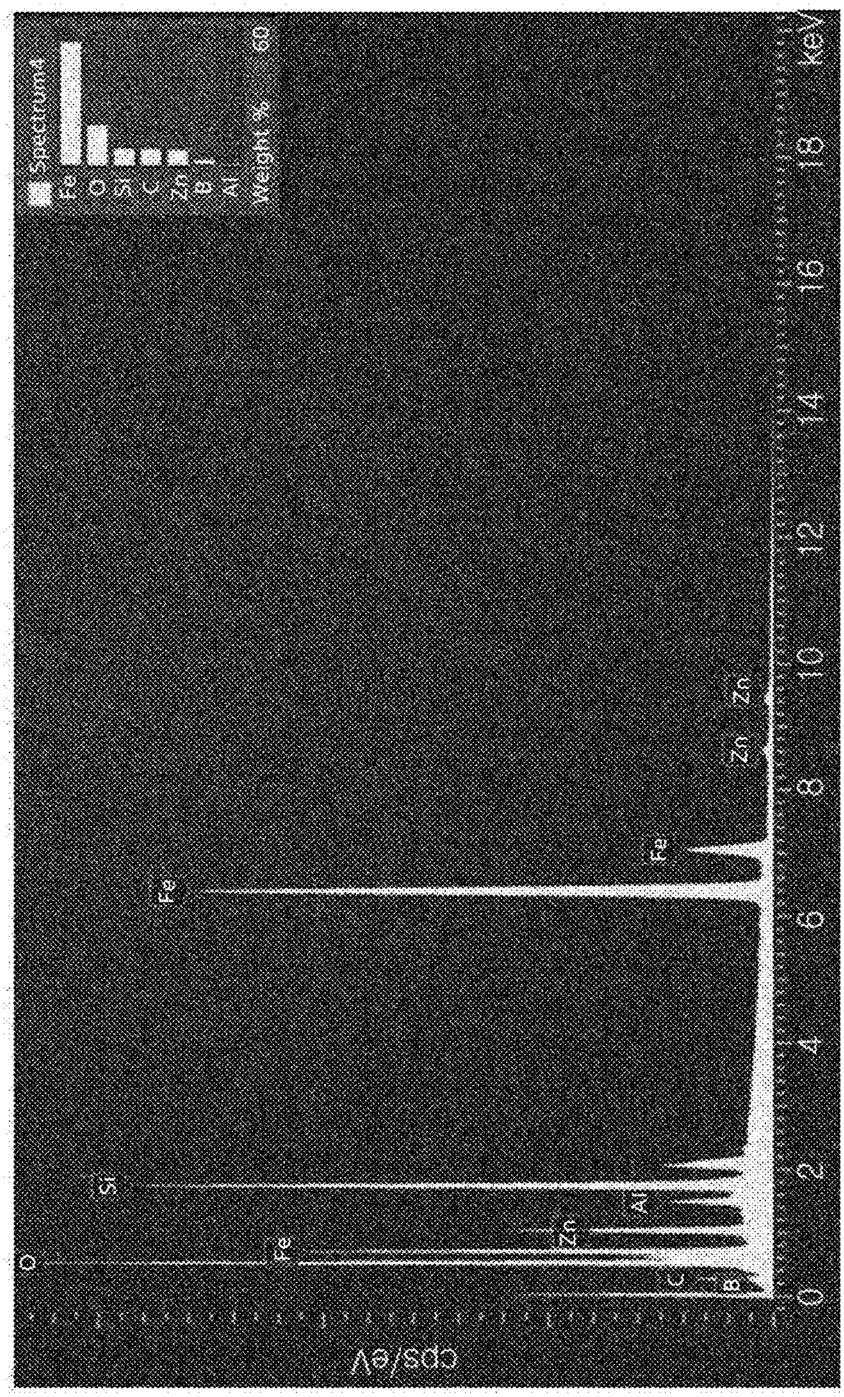
FIG. 7B shows an EDX analysis spectrum in the side surface of the magnetic core in the example.

Table 1 shows mass percentages of components according to EDX analysis results in an upper surface and a side surface of the magnetic core in the comparative example, Table 2 shows mass percentages of components according to EDX analysis results in an upper surface and a side surface of the magnetic core in the example, and Table 3 shows porosities and aspect ratios in the upper surface and the side surface of the magnetic core in the comparative example, and porosities and aspect ratios in the upper surface and the side surface of the magnetic core in the example. FIG. 4A shows a scanning electron microscope (SEM) image of the upper surface of the magnetic core in the comparative example, and FIG. 4B shows an EDX analysis spectrum in the upper surface of the magnetic core in the comparative example. FIG. 5A shows a SEM image of the side surface of the magnetic core in the comparative example, and FIG. 5B shows an EDX analysis spectrum in the side surface of the magnetic core in the comparative example. FIG. 6A shows a SEM image of the upper surface of the magnetic core in the example, and FIG. 6B shows an EDX analysis spectrum in the upper surface of the magnetic core in the example. FIG. 7A shows a SEM image of the side surface of the magnetic core in the example, and FIG. 7B shows an EDX analysis spectrum in the side surface of the magnetic core in the example. FIGS. 4B, 5B, 6B, and 7B show average values of the analysis results in regions of 250 μm×250 μm in FIGS. 4A, 5A, 6A, and 7A, respectively.

TABLE 1

| Element | Electron Shell | Upper Surface (wt %) | Side Surface (wt %) |
|---|---|---|---|
| B | K | 4.06 | 2.93 |
| C | K | 11.22 | 8.40 |
| O | K | 15.85 | 17.64 |
| Al | K | 0.97 | 0.95 |
| Si | K | 7.50 | 7.77 |
| Fe | K | 55.26 | 54.68 |
| Zn | L | 5.15 | 7.61 |
| Total (wt %) | | 100 | 100 |

TABLE 2

| Element | Electron Shell | Upper Surface (wt %) | Side Surface (wt %) |
|---|---|---|---|
| B | K | 2.16 | 3.14 |
| C | K | 7.52 | 7.87 |
| O | K | 13.55 | 18.15 |
| Al | K | 1.07 | 1.05 |
| Si | K | 8.16 | 8.04 |
| Fe | K | 62.34 | 54.26 |
| Zn | L | 3.80 | 7.48 |
| Total (wt %) | | 100 | 100 |

TABLE 3

| Experiment # | Position | Porosity | Aspect Ratio |
|---|---|---|---|
| Comparative | Upper surface | 0.00047% | 1.41:1 |
| Example | Side surface | 0.0012% | 4.09:1 |
| Example | Upper surface | 0.00043% | 1.24:1 |
| | Side surface | 0.0010% | 4.85:1 |

Referring to FIGS. 4A, 5A, 6A, and 7A, it can be seen that a shape of a distribution of the particles formed of Fe—Si—B in the upper surface of the magnetic core is different from a shape of a distribution of the particles formed of Fe—Si—B in the side surface of the magnetic core. That is, it can be seen that the porosity of the upper surface of the magnetic core is different from the porosity of the side surface of the magnetic core, and an average aspect ratio of each particle formed of Fe—Si—B in the upper surface of the magnetic core is different from an average aspect ratio of each particle formed of Fe—Si—B in the side surface of the magnetic core. In particular, referring to Table 3, it can be seen that the average aspect ratio of the upper surface S1 of the magnetic core 110 according to the embodiment is in the range of 1.1:1 to 1.4:1, and the average aspect ratio of the side surface S2 of the magnetic core 110 according to the embodiment is in the range of 4.2:1 to 5.2:1. In addition, it can be seen that the average aspect ratio of the side surface S2 is 3 or more (4.85/1.24) times the average aspect ratio of the upper surface S1 of the magnetic core 110 according to the embodiment. In addition, in can be seen that the porosity of the side surface S2 of the magnetic core 110 is 2 or more times, preferably 2 to 2.5 times, and more preferably 2.2 to 2.4 times (0.0010%/0.00043%) the porosity of the upper surface S1 of the magnetic core 110.

Accordingly, as shown in Table 2, a composition of the upper surface of the magnetic core is different from a composition of the side surface of the magnetic core. That is, a mass percentage of Fe in the upper surface of the magnetic core may be at least 1.02 times, preferably 1.05 to 1.2 times, and more preferably 1.1 to 1.2 times a mass percentage of Fe in the side surface of the magnetic core, mass percentages of Zn and O in the side surface of the magnetic core may be greater than mass percentages of Zn and O in the upper surface of the magnetic core, and a difference between mass percentages of Fe and Si in the upper surface of the magnetic core may be greater than a difference between mass percentages of Fe and Si in the side surface of the magnetic core. This means that the particles formed of Fe—Si—B in the magnetic core according to the embodiment of the present invention are stacked with a high density, and low loss and high permeability can be obtained from the magnetic core according to the embodiment of the present invention.

In order to more clearly understand a difference between the upper surface of the magnetic core and the side surface of the magnetic core, the EDX analysis spectrum may be used. Referring to FIGS. 4B, 5B, 6B, and 7B, it can be seen that an EDX analysis spectrum in the upper surface of the magnetic core is different from an EDX analysis spectrum in the side surface of the magnetic core. That is, it can be seen that a count per second (cps)/electronvolt (eV) of Fe in the upper surface of the magnetic core is different from a cps/eV of Fe in the side surface of the magnetic core. In this case, a cps/eV is defined as the number of counts per second per eV, and may be the number of counts of X-rays emitted when predetermined energy is applied, and components in a magnetic core may be analyzed using the cps/eV. For example, a cps/eV of X-rays emitted from 6 to 6.8 keV means a cps/eV of Fe(K) and may be different between in an upper surface and a side surface of a magnetic core. As illustrated in FIGS. 4B, 5B, 6B, and 7B, a cps/eV of X-rays emitted from 6 to 6.8 keV, that is, a cps/eV of Fe(K) may be different in the comparative example and the example. In addition, a difference in cps/eV between Si and Fe(K) may be different in the comparative example and the example.

Table 4 is a table in which performance of the magnetic core in the example of the present invention and performance of the magnetic core in the comparative example are compared.

TABLE 4

| | Example | Comparative Example | Improvement Rate |
|---|---|---|---|
| Forming Density (g/cc) | 5.42 | 5.25 | 3% |
| Loss (@65 Hz, 50 mT) | 49.60 | 60.92 | 19% |
| LO | 44.53 | 35.60 | 25% |
| Ldc | 31.71 | 29.50 | 8% |
| Initial Permeability | 55.56 | 43.10 | 29% |
| Permeability (@100 Oe) | 39.57 | 35.70 | 11% |

It can be seen that the magnetic core in the example has a higher density than the magnetic core in the comparative example.

Referring to Table 4, it can be seen that the magnetic core in the example has a loss lower than the magnetic core in the comparative example under a magnetic field condition of 65 Hz and 50 mT. In addition, it can be seen that there is an effect that an initial inductance (LO) and an inductance (Ldc) under a condition of an actual current of 15.6 A in the example are superior to those in the comparative example. In addition, it can be seen that there is an effect that an initial permeability and a permeability (permeability @ 100 Oe) at an actual current in the example are superior to those in the comparative example.

As described above, according to the embodiment of the present invention, the magnetic core capable of maintaining low loss, high permeability, and high inductance can be obtained, and thus the coil component such as an inductor and a transformer can be minimized. The magnetic core according to the embodiment of the present invention may be applied to a high-current reduction inductor, a high-current boost inductor, and a three-phase line reactor for power factor correction (PFC) used in a photovoltaic system, a wind power generation system, an electric vehicle, and the like. When the magnetic core according to the embodiment of the present invention is applied, DC current superposition characteristics at a high-current can be improved, a core loss at a high frequency can be reduced, and a stable permeability can be obtained.

In the present specification, it has been described that an example of the magnetic core has the toroidal shape in which a middle portion of a cylinder is empty, but is not limited thereto, and the embodiment of the present invention may be applied to cores of various shapes such as EER, ER, EE, EQ, and PQ.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

100: COIL COMPONENT
110: MAGNETIC CORE
120: COIL
112: Fe—Si—B PARTICLE
114: RESIN

The invention claimed is:

1. A magnetic core comprising a material formed of iron (Fe)-silicon (Si)-boron (B), wherein a mass percentage of Fe in a first surface, which is an upper surface, is different from a mass percentage of Fe in a second surface which is a side surface, and a ratio of the mass percentage of Fe in the first surface to a difference between the mass percentage of Fe in the first surface and the mass percentage of Fe in the second surface is in the range of 6 to 21.

2. The magnetic core of claim 1, wherein the ratio of the mass percentage of Fe in the first surface to the difference between the mass percentage of Fe in the first surface and the mass percentage of Fe in the second surface is in the range of 11 to 21.

3. The magnetic core of claim 1, wherein the mass percentage of Fe in the first surface is greater than the mass percentage of Fe in the second surface.

4. The magnetic core of claim 2, wherein a porosity of the first surface is different from a porosity of the second surface.

5. The magnetic core of claim 2, wherein an average aspect ratio of the material formed of the Fe—Si—B in the first surface is different from an average aspect ratio of the material formed of the Fe—Si—B in the second surface.

6. The magnetic core of claim 1, wherein a difference between the mass percentage of Fe and a mass percentage of Si in the first surface is different from a difference between the mass percentage of Fe and a mass percentage of Si in the second surface.

7. The magnetic core of claim 6, wherein the difference between the mass percentage of Fe and the mass percentage of Si in the first surface is greater than the difference between the mass percentage of Fe and the mass percentage of Si in the second surface.

* * * * *